(12) United States Patent
Dashevsky et al.

(10) Patent No.: US 10,344,533 B2
(45) Date of Patent: Jul. 9, 2019

(54) PREDICTING DRILLABILITY BASED ON ELECTROMAGNETIC EMISSIONS DURING DRILLING

(71) Applicants: BAKER HUGHES INCORPORATED, Houston, TX (US); Zarema Dubinsky, Houston, TX (US)

(72) Inventors: Yuliy A. Dashevsky, Novosibirsk (RU); Sergey A. Terentev, Omsk (RU); Vitaly N. Dorovsky, Novosibirsk (RU); Vladimir Dubinsky, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 204 days.

(21) Appl. No.: 15/030,273

(22) PCT Filed: Oct. 18, 2013

(86) PCT No.: PCT/RU2013/000922
§ 371 (c)(1),
(2) Date: Apr. 18, 2016

(87) PCT Pub. No.: WO2015/057099
PCT Pub. Date: Apr. 23, 2015

(65) Prior Publication Data
US 2016/0273330 A1   Sep. 22, 2016

(51) Int. Cl.
*E21B 7/00* (2006.01)
*E21B 47/00* (2012.01)
(Continued)

(52) U.S. Cl.
CPC ............... *E21B 7/00* (2013.01); *E21B 10/00* (2013.01); *E21B 10/08* (2013.01); *E21B 10/36* (2013.01);
(Continued)

(58) Field of Classification Search
CPC .......... E21B 44/00; E21B 10/00; E21B 10/08; E21B 10/36; E21B 10/42; E21B 12/02;
(Continued)

(56) References Cited

U.S. PATENT DOCUMENTS 4,474,250 A   10/1984   Dardick
4,742,402 A    5/1988   Sobolev et al.
(Continued)

FOREIGN PATENT DOCUMENTS

EP   1193366 A2   4/2002
RU   2253098 U1   5/2005
(Continued)

OTHER PUBLICATIONS

Evseev V.D., "Drilling of Oil and Gas Wells, Increase of Efficiency of Drilling of Oil and Gas Wells";Proceedings of Tomsk Polytechnic University, English/Russian; 2005, V. 308, - ? 6.; 38 pages.
(Continued)

*Primary Examiner* — Ajay Ojha
(74) *Attorney, Agent, or Firm* — Cantor Colburn LLP (57) ABSTRACT

An embodiment of a method of predicting drilling assembly performance includes: acquiring measurements of electromagnetic (EM) radiation emitted due to destruction of formation materials by a drilling assembly during a drilling operation; selecting input parameters, the input parameters including drilling assembly parameters, operational parameters, and the measurements of the EM radiation; supplying the input parameters to a mathematical drillability model; and generating a rock drillability parameter using the drillability model and the input parameters, the rock drillability parameter providing an indication of drilling performance.

18 Claims, 7 Drawing Sheets

(51) Int. Cl.
*E21B 47/09* (2012.01)
*E21B 47/12* (2012.01)
*G01V 11/00* (2006.01)
*E21B 10/00* (2006.01)
*E21B 10/08* (2006.01)
*E21B 10/36* (2006.01)
*E21B 10/42* (2006.01)
*E21B 12/02* (2006.01)
*E21B 44/00* (2006.01)
*E21B 45/00* (2006.01)
*G01V 99/00* (2009.01)
*G06F 17/50* (2006.01)
*E21B 10/26* (2006.01)
*E21B 17/10* (2006.01)
*E21B 47/18* (2012.01)
*E21B 41/00* (2006.01)

(52) U.S. Cl.
CPC .............. *E21B 10/42* (2013.01); *E21B 12/02* (2013.01); *E21B 44/00* (2013.01); *E21B 45/00* (2013.01); *E21B 47/00* (2013.01); *E21B 47/0905* (2013.01); *E21B 47/12* (2013.01); *G01V 11/007* (2013.01); *G01V 99/005* (2013.01); *G06F 17/5009* (2013.01); *E21B 10/26* (2013.01); *E21B 17/1078* (2013.01); *E21B 47/18* (2013.01); *E21B 2041/0028* (2013.01); *G06F 2217/16* (2013.01)

(58) Field of Classification Search
CPC ...... E21B 45/00; E21B 47/0905; E21B 47/12; E21B 47/18; E21B 2041/0028; E21B 10/26; E21B 17/1078; G01V 99/005; G01V 11/007; G06F 17/5009; G06F 2217/16
See application file for complete search history.

(56) References Cited

U.S. PATENT DOCUMENTS

| | | | |
|---|---|---|---|
| 6,176,323 | B1 | 1/2001 | Weirich et al. |
| 6,452,395 | B1 | 9/2002 | Clarke et al. |
| 7,404,456 | B2 | 7/2008 | Weaver et al. |
| 7,565,245 | B2 | 7/2009 | Andreis et al. |
| 7,578,359 | B2 | 8/2009 | Coates et al. |
| 7,839,346 | B2 | 11/2010 | Bittar et al. |
| 2005/0132794 | A1 | 6/2005 | Spross et al. |
| 2005/0194134 | A1 | 9/2005 | McGregor et al. |
| 2009/0152005 | A1 | 6/2009 | Chapman et al. |
| 2011/0074428 | A1 | 3/2011 | Wang et al. |
| 2011/0108325 | A1 | 5/2011 | Hartmann et al. |

FOREIGN PATENT DOCUMENTS

| | | |
|---|---|---|
| RU | 2494367 C2 | 9/2013 |
| WO | 2001006278 A1 | 1/2001 |
| WO | 2010039342 A1 | 4/2010 |
| WO | 2012015421 A1 | 2/2012 |
| WO | 2015057099 A1 | 4/2015 |

OTHER PUBLICATIONS

Frid, et al.; "Depolarizatin in percussion drilling of Solenhofen limestone"; Journal of Applied Physics, Feb. 22, 2005; 4 pages.
Frid, et al.; "Fracture induced electromagnetic radiation", Journal of Physics D: Applied Physics, Jun. 18, 2003, pp. 1620-1628.
Goldbaum, et al.; "An Analysis of complex electromagnetic radiation signals induced by fracture"; Measurement Science and Technology, Sep. 2, 2003; 6 pages.
Notification of Transmittal of the International Search Report and the Written Opinion of the International Searching Authority, or the Declaration; PCT/RU2013/000922; dated Oct. 2, 2014; 11 pages.
Shakhmatov K.V.; "Study of electric currents generated at bottomhole while drilling //Problems of Geology and Subsurface Development"; Proceedings of Tomsk Polytechnic University, English/Russian; 2005; 45 pages.
Russian Office Action, Russian Patent Application No. 2016117367, dated Jul. 28, 2017, Russian Patent Office; Russian Office Action 7 pages, Office Action Translation 3 pages.
Koktavy, P. "Experimental study of electromagnetic emission signals generated by crack generation in composite materials", Measurement Science and Technology, vol. 20 (2009) 8 pages.
Neishtadt et al. "Application of piezoelectric and seismoelectrokinetic phenomena in exploration geophysics: Review of Russian and Israeli experiences", Society of Exploration Geophysicists, US, vol. 71, No. 2, Mar. 1, 2006; pp. B41-B53.

PREDICTING DRILLABILITY BASED ON ELECTROMAGNETIC EMISSIONS DURING DRILLING

CROSS REFERENCE TO RELATED APPLICATIONS

This application claims the benefit of an earlier filing date from Russian Application Serial No. PCT/RU13/000922 filed Oct. 18, 2013 the entire disclosure of which is incorporated herein by reference.

BACKGROUND

The cost of drilling oil and gas wells is typically very high. Consequently, it is desirable to improve drilling efficiency, e.g., by decreasing the amount of rig time required to reach the objective depth of the well. Optimizing drilling parameters such as drill bit selection and operating conditions can dramatically reduce the required drilling time.

SUMMARY

An embodiment of a method of predicting drilling assembly performance includes: acquiring measurements of electromagnetic (EM) radiation emitted due to destruction of formation materials by a drilling assembly during a drilling operation; selecting input parameters, the input parameters including drilling assembly parameters, operational parameters, and the measurements of the EM radiation; supplying the input parameters to a mathematical drillability model; and generating a rock drillability parameter using the drillability model and the input parameters, the rock drillability parameter providing an indication of drilling performance.

An embodiment of a system for predicting drilling assembly performance includes: a drilling assembly including a drill bit connected to a drill string, the drilling assembly configured to be disposed in a borehole and perform a drilling operation; a sensor device operatively associated with the drilling assembly, the sensor configured to measure electromagnetic (EM) radiation emitted due to destruction of formation materials by the drill bit during the drilling operation; and a processor in communication with the plurality of sensors. The processor is configured to: supply input parameters to a mathematical drillability model, the input parameters including drilling assembly parameters, operational parameters, and measurements of the EM radiation; and generate a rock drillability parameter using the drillability model and the input parameters, the rock drillability parameter providing an indication of drilling performance.

An embodiment of a computer program product for predicting drilling assembly performance includes a tangible storage medium readable by a processing circuit and storing instructions for execution by the processing circuit for performing a method comprising: acquiring measurements of electromagnetic (EM) radiation emitted due to destruction of formation materials by a drilling assembly during a drilling operation; selecting input parameters, the input parameters including drilling assembly parameters, operational parameters, and the measurements of the EM radiation; supplying the input parameters to a mathematical drillability model; and generating a rock drillability parameter using the drillability model and the input parameters, the rock drillability parameter providing an indication of drilling performance.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION

Disclosed are systems, apparatuses and methods for predicting rock drillability based on measurements of electromagnetic emission (EME) during a drilling operation. One embodiment includes an apparatus (e.g., a bottomhole assembly or drill bit assembly) for obtaining measurements of EME emitted while drilling, which includes sensors for measuring different frequencies of EM radiation as well as electric current induced by rock destruction during drilling. One embodiment includes a predictive mathematical model of rock drillability that calculates drillability parameters (e.g., bit wear relative to rate of penetration) based on input parameters such as formation parameters, drilling assembly parameters, operational parameter and measured EME data. An exemplary model is a neural network model configured to perform a drillability prediction based on input parameters that include EME measurements. Input parameters including EME measurements taken during a drilling operation can be measured and processed for later drilling operations, or processed in real time to provide drillability predictions during drilling.

Figure 1:
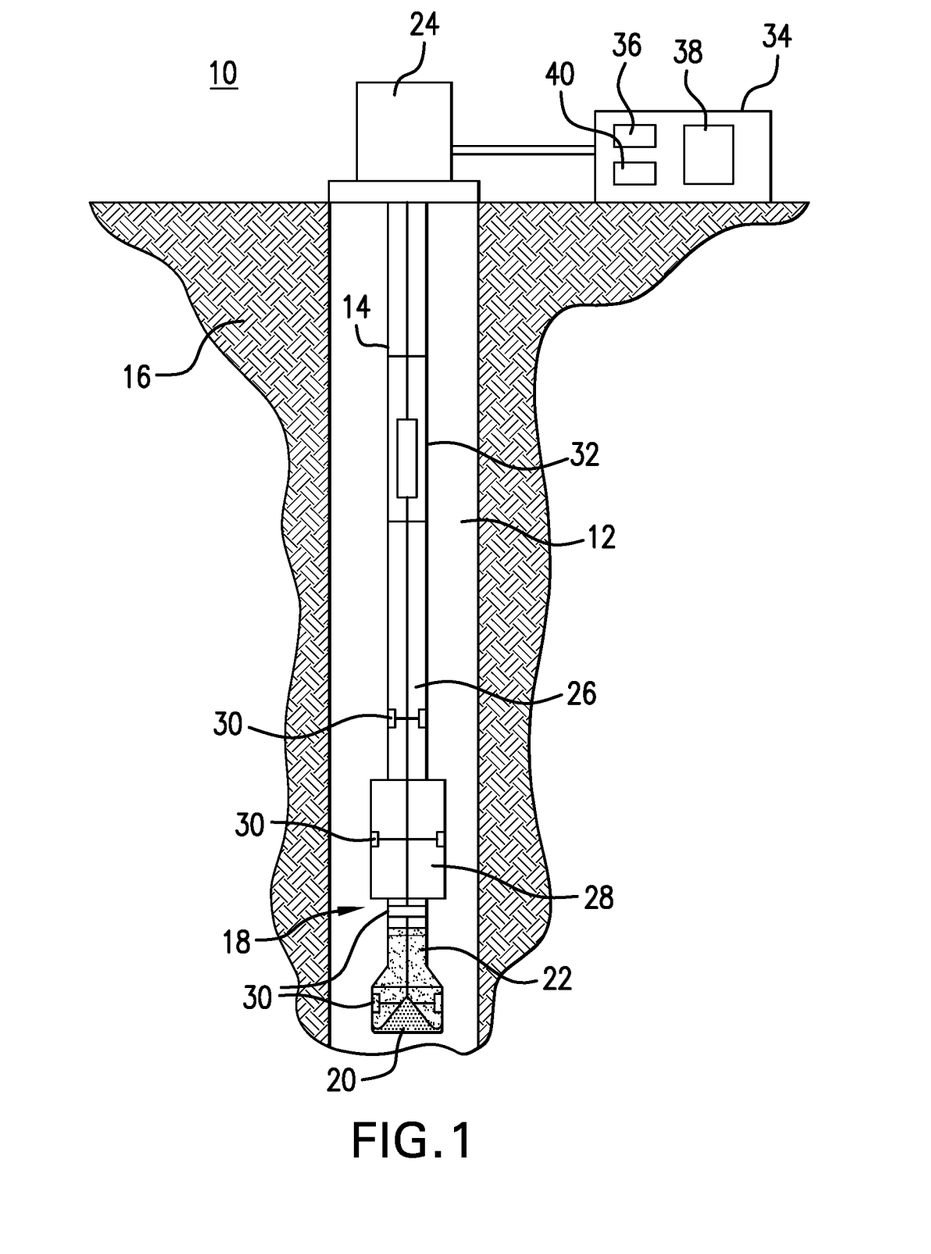
FIG. 1 is an exemplary embodiment of a drilling system including a drill string disposed in a borehole in an earth formation.

Referring to FIG. 1, an exemplary embodiment of a downhole drilling system 10 is shown, components of which are disposed in a borehole 12. A drill string 14 is disposed in the borehole 12, which penetrates at least one earth formation 16. The drill string 14 is made from, for example, a pipe or multiple pipe sections. The system 10 and/or the drill string 14 include a drilling assembly 18. Various measurement tools may be incorporated into the system 10 to affect measurement regimes such as logging-while-drilling (LWD) applications.

The drilling assembly 18, which may be configured as a bottomhole assembly (BHA), includes a drill bit 20 that is attached to the bottom end of the drill string 14 via a drilling assembly body 22. The drilling assembly 18 is configured to be conveyed into the borehole 12 from a drilling rig 24. The drilling assembly 18 includes various components that provide structural and operational support to the drill bit 20, such as a drilling motor 26 (also referred to as a mud motor), and a stabilizer or reamer 28.

In one embodiment, the drill bit 20 and/or drilling assembly 18 includes one or more sensors 30 and related circuitry for estimating one or more parameters relating to the drilling assembly 18. The sensors 30 perform measurements associated with the drilling assembly, the borehole and/or the formation during drilling. For example, the sensors 30 include sensors configured to measure electromagnetic (EM) radiation emitted by destruction of formation materials as the borehole 12 is drilled. In addition, the sensors can be configured to measure drilling parameters such as rotation, vibration, accelerations, velocities, distances, angles, forces, moments, and pressures. Other parameters that could be measured include environmental parameters such as temperature and pressure, and formation parameters such as resistivity and porosity. In one embodiment, the sensors 30 are coupled to a downhole electronics unit 32, which may receive data from the sensors 30 and transmit the data to a processing system such as a processing unit 34, and/or process data downhole. Various techniques may be used to transmit the data to the electronics unit 32 and the surface processing unit 34, such as mud pulse, electromagnetic, acoustic telemetry, or wired pipe.

The surface processing unit 34 is connected in operable communication with the drilling assembly 18 and may be located, for example, at a surface location, a subsea location and/or a surface location on a marine well platform or a marine craft. The surface processing unit 34 is configured to perform functions such as controlling the drilling assembly 18, transmitting and receiving data, processing measurement data, monitoring the drilling assembly 18, and performing simulations or predictions using mathematical models. The surface processing unit 34, in one embodiment, includes a processor 36, a data storage device (or a computer-readable medium) 38 for storing, data, models and/or computer programs or software 40.

In one embodiment, the sensors 30 are configured to measure electromagnetic emission (EME) resulting from mechanical stress on formation materials or rock during a drilling operation. Various types of sensors may be utilized to perform such measurements. EME measurements can be used to estimate parameters of the formation, such as rock characteristics and rock drillability. The phenomenon of EME and acoustic emission is generally referred to as "fractoemission". Fractoemission may be due to several kinds of mechanical stress: tensile, compression or torsional, which is induced by friction, shock, drilling, etc.

Figure 2:
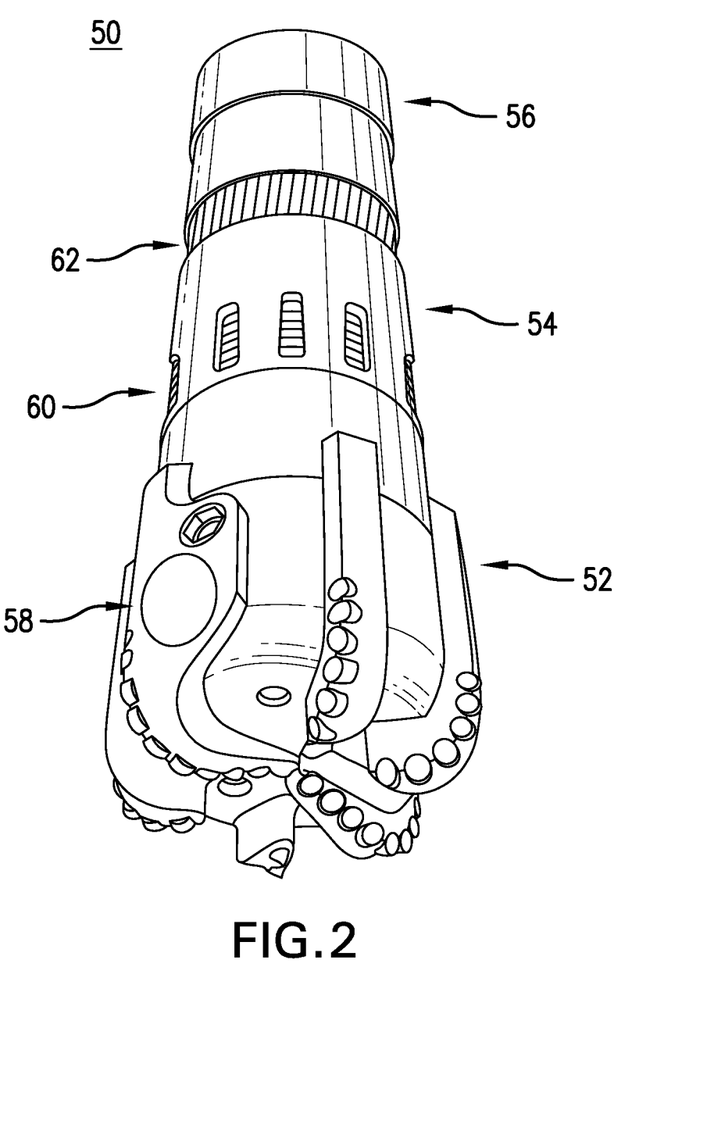
FIG. 2 is a perspective view of an exemplary embodiment of a drill bit assembly that includes one or more sensors for measuring electromagnetic radiation emitted during drilling.

FIG. 2 shows an embodiment of a drilling assembly and/or BHA 50. The assembly 50 includes a drill bit 52, a tool 54 (e.g., a LWD tool) and a pipe or drill string segment 56. The configuration and components of the drilling assembly 50 are not limited to the embodiments described herein. For example, the drill bit 52 is not limited to the embodiments described herein, and may be any type of earth boring drill bit, such as a roller cone bit, a drag bit or a percussion drill bit. The assembly 50 can be incorporated into any drilling system, such as the system 10 discussed above. The drilling assembly 50 includes one or more sensors for measuring EME during drilling. Multiple sensors may be incorporated to measure different aspects of the emission, including different spectral components and currents associated with the EME. In one embodiment, the assembly 50 includes a high frequency sensor 58, a low frequency sensor 60 and a medium frequency sensor 62.

For example, the low frequency sensor 60 includes one or more induction coils for measurement of a low frequency part of the EME spectrum (e.g., radio frequency (RF) signals below about 300 kHz). For signals of medium frequency (e.g., radio frequencies of about 300 kHz to 3 MHz), an AC current sensor such as a Rogovsky coil or Rogovsky belt is included in the medium frequency sensor 62. This device allows for measurement of time-dependent electric current, which is induced by electromagnetic emission from a cracked zone of rock (which can be characterized as a strain sensing element as discussed below) proximate to the drill bit. The high frequency sensor 58 includes one or more sensors, e.g., antenna-type sensors, for measurement of a high frequency (e.g., greater than about 3 MHz) part of the EME spectrum. In one embodiment, the EME frequencies detected are primarily in the radio band (i.e., radio frequencies), although other frequencies could be detected.

Other types of tools may be included in the system 10, the drilling assembly 18 and/or the drilling assembly 50. Such tools may include resistivity tools, acoustic tools, nuclear magnetic resonance (NMR) tools, gamma ray tools, nuclear logging tools, formation testing tools and other desired tools. Each such tool may process signals and data according to programmed instructions and provide information about certain properties of the formation, which can be used to provide a drillability prediction.

At least one processor, such as the downhole electronics unit 32 and/or the surface processing unit 34, is configured to generate and/or use a mathematical model. The model may be used to select and/or optimize drilling parameters such as drill bit selection and operational parameters. In one embodiment, the model is configured to provide estimations or predictions of drilling performance in the form of one or more performance and/or tool wear parameters (referred to generally as "drillability" or "rock drillability" parameters). Rock drillability describes the influence of a number of parameters (e.g., operational parameters, formation parameters, environmental and/or borehole fluid parameters) on drilling performance. Inputs to the model include various parameters and measurements, including measurements of EME taken during a drilling process, which can be applied in real time to provide drillability predictions or used for subsequent model analysis.

Rock drillability as described herein is an indicator or estimation of the effect of rock destruction under pressure, and the energy required for such destruction, on drilling performance. As described herein, "destruction" refers to the reduction in size or change in form of formation materials or rock by a drill bit during drilling. Drillability encompasses indications of drilling performance or drilling conditions such as rate of penetration (ROP) and drill bit wear.

As described herein, "rock" refers to any formation materials that are deformed or destroyed (e.g., cracked, crushed or chipped) during drilling, and is not limited to the embodiments and examples described herein. The rock may be any combination of solid or aggregate material (e.g., minerals and/or organic matter such as coal) making up at least a portion of a formation. Examples of rock include sedimentary rocks (e.g., sandstone), igneous rocks (e.g., granite) and metamorphic rocks. Rock may contain a single mineral or other material, or be a combination of multiple materials.

The model is chosen or configured based on the physics of the drilling process under pressurized conditions found downhole. The model is configured based on the recognition that the mechanism of rock destruction in high pressure condition is very different from that at atmospheric conditions.

For example, modeling of rock cutting under high pressure conditions, such as are experienced during subterranean drilling, indicates that mechanical properties of crushed rock are more significant indicators of rock drillability than the mechanical properties of the original elastic rock since the deformation and extrusion of crushed rock consumes the bulk of the energy expended in rock destruction under pressurized downhole conditions. Accordingly, the model utilizes measurements of EME during drilling to estimate or predict the amount of energy consumed in crushing the rock, which can be used an indicator of drillability.

Figure 3:
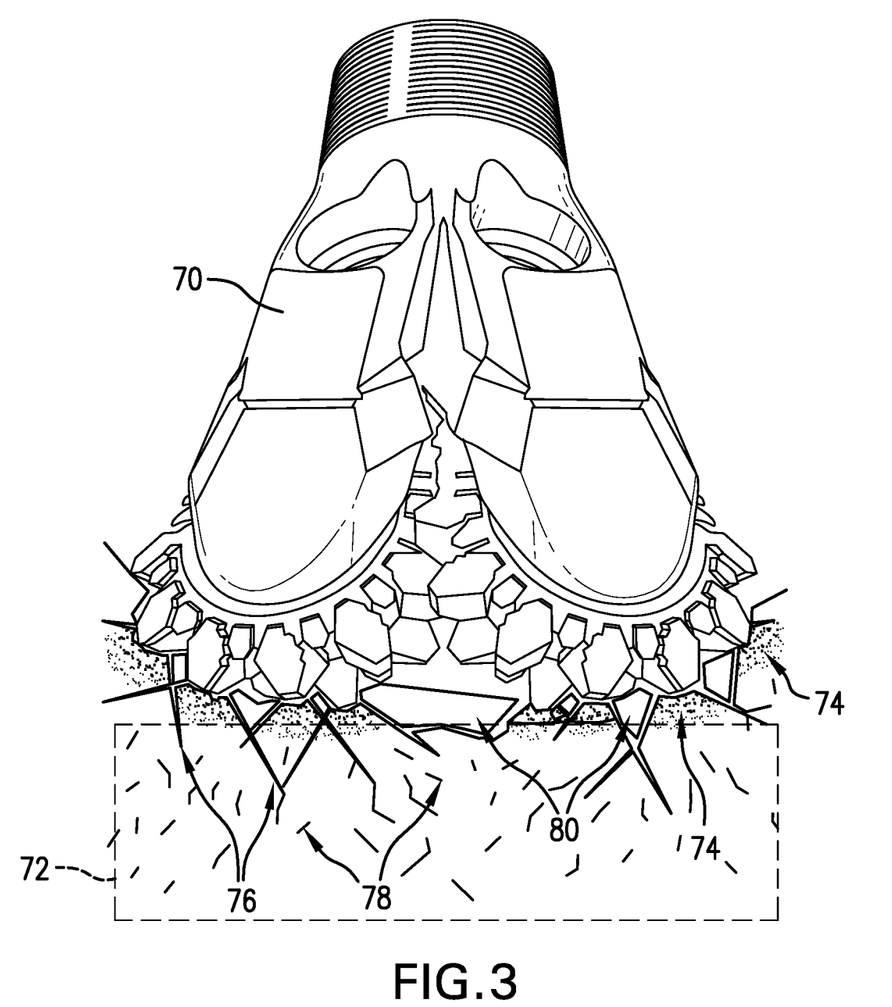
FIG. 3 is an illustration of various features of a region of a formation below a drill bit that are formed during drilling.

FIG. 3 illustrates different potential destruction mechanisms of rock in a formation during a drilling process. As a drill bit 70 cuts through rock, various processes occur in the region of rock proximate to the drill bit 70, including cracking, fragmenting and crushing of the rock. Electromagnetic energy may be generated by such processes.

A region below the drill bit is subject to strain representing the relative displacement between particles in the material body (rock mass), i.e. a measure of how much a given displacement differs locally from a rigid-body displacement. Deformations result from stresses within the rock mass induced by external forces including the drill bit, and/ or due to changes in its temperature. This region, denoted as region 72, is identified as a closed volume of rock mass that acts as a strain sensing element, because the region 72 responds to the stress-strain process during drilling by emitting by electromagnetic and/or acoustic energy.

During drilling, various destruction mechanisms occur. Under the bit button, a crushed zone of crushed rock or rock powder 74 is formed due to impact between the bit and the rock. Other destruction mechanisms can include radial cracks 76 developed due to induced tensile stress, and microcracks 78 formed in the region 72. When stress in the rock is high enough and enough cracks exist parallel to the bottom of the hole, larger fragments 80 of the rock can be sheared off. In addition to these mechanisms, stress can be periodically induced if percussive drilling is performed. As is evident, the bit is always drilling through pre-cracked rock, and the drillability strongly depends on the quantity of specific energy necessary to build new surfaces (e.g., cracks and/or particles) in rock. Specific energy is the energy required to remove a unit volume of rocks.

Drilling processes performed at atmospheric pressure can be distinguished from processes performed in high pressure conditions. At atmospheric conditions, a cutter drives long cracks (e.g., cracks 76) into the rock, creating large chips (e.g., fragments 80) of elastic rock. These chips usually fly away from the cutting face due to the release of elastic energy. In addition, when drilling process performed at atmospheric pressure, the specific energy approaches a number numerically close to the uniaxial compressive strength (UCS) of the rock.

In high pressure environments, such as those found in formation/reservoir drilling environments, the differential pressure is an important factor governing drillability. The differential pressure is defined as the difference between the pressure of mud or other fluid in the borehole (borehole pressure) and the pressure in the pores of the rock (pore pressure). Rock cutting under pressure in a drilling fluid environment does not create chips. Instead, cuttings formed during drilling are not composed of chips of elastic material, but rather typically include completely crushed and recompacted material (e.g., rock powder 74).

Electromagnetic emission (EME) can occur due to various effects of the rock cutting. Such effects include variations in the density of surface electric charges, generation of gas-discharge processes and currents, and mechanical motion of charge surfaces and double layers. In high pressure environments, EME occurs in the strain-sensing region 72 in response to the stress-strain process by which cracks and crushed rock cuttings are formed. Whatever mechanism of electromagnetic emission is considered, characteristics of the EME (e.g., frequency, amplitude and pulse width) depend on the quantity of specific energy necessary to build new surfaces (cracks) in rock. As drillability (e.g., drill bit wear or useful life and/or ROP) strongly depends on the quantity of specific energy, EME measurements can be used as important indicators of drillability.

Different characteristics of EME can serve as indicators to be measured and processed with the purpose of the drillability prediction since the characteristics strongly depend on properties of the rock and drilling conditions. For example, EM signal pulses are emitted due to the formation of cracks in the rock, which have pulse lengths directly proportional to crack length and frequencies (e.g., low to medium radio frequencies) inversely proportional to crack width. Other parameters of EM pulses can be indicators of rock destruction. For example, the time of increase in pulse amplitude from the start of the pulse to the pulse maximum can be an indicator of crack length In addition to the induced EME, currents are induced by the drilling. Such currents follow a closed circuit in which the current flows from the region of rock below the bit to the drill bit (or other device for rock cutting), and returns to the region of rock. Since the rock crash is followed by EME, the emission causes the electric current that can be measured using a variety of devices and techniques. An example of such a device is a Rogovsky belt.

Figure 4:
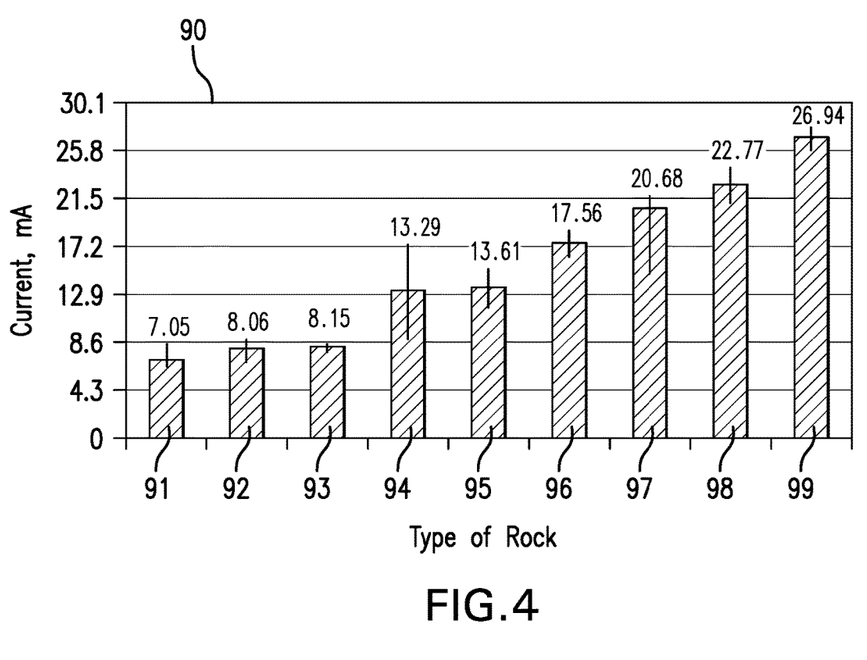
FIG. 4 is an example of data representing a relationship between rock or formation type and current measured during drilling.

The measured currents are dependent on the rock type that is being drilled, and can thus be an indicator of rock type. For example, FIG. 4 shows laboratory experimental results 90 of current measured in close circuit while cutting different types of rock.

Amplitude value 91 corresponds to a siltstone-sandstone alternation, value 92 corresponds to coarse-grained siltstone, value 93 corresponds to clay, value 94 corresponds to medium sandstone with a high content of coarse-grained material, value 95 corresponds to coarse-grained/medium sandstone with tiff cement, value 96 corresponds to coarse-grained/medium sandstone with tiff/quartz cement, value 97 corresponds to granite, value 98 corresponds to fine-grained sandstone with tiff cement, and value 99 corresponds to granite with tiff filled cracks. As is evident, the measured current shows a clear dependence on the rock type.

Figure 5:
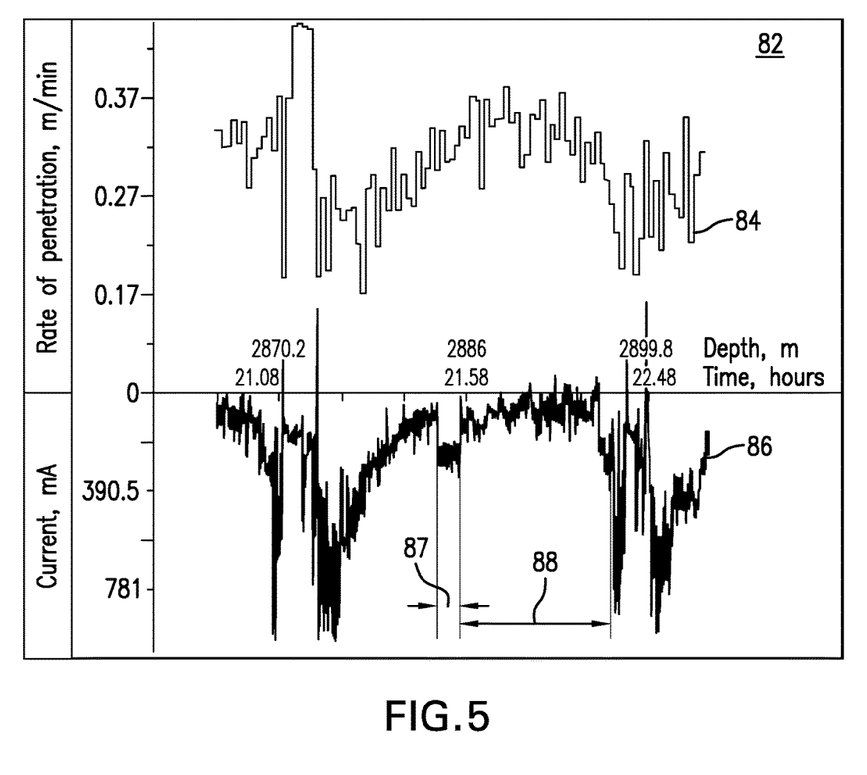
FIG. 5 demonstrates exemplary field results of measurement of currents induced during a drilling process.

FIG. 5 demonstrates exemplary field results 82 of measurement of currents induced during a drilling process. The field results 82 show the rate of penetration 84 compared with current measurements 86. In order to perform measurements of the current magnitude, a close circuit was created in which, during the drilling process, current flowed from a region in a formation below a drill bit to the drill bit, and then reached a control head and returned to the formation. Measurements took place near the control head. A depth interval 87 shows the current measured in a water-saturated portion of the formation, and a depth interval 88 shows the current measured in an oil-saturated portion of the formation. As is demonstrated by this example, the measured currents are dependent on the rock type that is being drilled, e.g., water-saturated or oil-saturated, and the current magnitude is inversely proportional to the rate of penetration.

Based on the above considerations, a model such as a neural network model is constructed that provides drillability and/or performance estimates or predictions based on input parameters relating to a drilling operation. Such parameters may include formation material parameters including rock type and physical parameters, operational parameters, drill rig or drilling assembly parameters, induced currents, and parameters of EME measured while drilling.

Using the above parameters, a drillability estimate or prediction is generated by the model. The drillability estimate or prediction is influenced by a plurality of criteria or characteristics (e.g., geomechanical properties of the rocks, machine parameters, operating process parameters, etc.). The drillability prediction can be derived from various predicted or estimated parameters, such rate of penetration (ROP) prediction and bit wear or bit life prediction. In one embodiment, the drillability prediction is an estimation of drill bit wear over time as a function of ROP.

The drill rig or drilling assembly parameters, i.e., technical parameters of the chosen drilling rig, have a dramatic impact on drillability. Exemplary parameters include the bit type (e.g., rolling cutter bits, hammer bits, polycrystalline diamond compact (PDC) bits and natural diameter bits (NDB)) and geometric or structural parameters such as diameter, size and number of cutters.

Formation material or geological parameters influence drilling performance as well as wear on the drilling rig. Exemplary formation material properties include rock type, physical parameters of rock material (e.g., texture and grain size, material strength parameters), and structural parameters (e.g., joint spacing, joint dip, and joint aperture and filing). Material strength parameters include Mohs hardness and uniaxial compressive strength (UCS), which is related to properties such as density, porosity, elasticity and plasticity.

Operational parameters include parameters or conditions of the drilling process itself. Examples of such parameters include measured depth, true vertical depth, weight on bit (WOB), rotary speed, flow rate, mud weight, mud type (e.g., water or oil based mud, and drilling mode (e.g., vertical pressure, rotary, and percussion).

In addition, EME parameters are included as inputs, which are based on measured EME from a rock mass (e.g., the region 72) that experiences stress-strain during drilling. EME parameter measurements provide indicators of properties of the rock and rock destruction at certain drilling conditions. The EME parameters can be taken from measurements performed during a previous drilling operation (i.e., drilling performed prior to the operation for which drillability predictions are desired) or during the current operation for which drillability predictions are desired. For example, a previous drilling operation can be performed in another borehole in the same formation or area of interest (e.g., an offset well), performed in another borehole in other areas, or performed in the same borehole as the current operation. Predictions from previous drilling operations can be used in selecting both drilling operational parameters and drilling assembly parameters such as bit type.

The EME parameters can be measured during a drilling operation for which drillability predictions are desired. For example, during a drilling operation, EME measurements are performed and input to a neural network or other model in real time or near real time. Such measurements are used to update drillability estimates or predictions and adjust drilling parameters (e.g., WOB, flow rate, RPM) during the drilling operation.

One or more of the above input parameters can be selected based on data from any suitable source, such as offset wells in the same formation or field as the well of interest or other wells in other areas having similarities to the formation of interest, thereby incorporating the knowledge gained from such sources into the prediction.

In one embodiment, the model is designed as a neural network into which EME measurements and other parameters are input. Neural networks are useful due to their capability to identify complex relationships when sufficient data exist and no deterministic model can be created.

Figure 6:
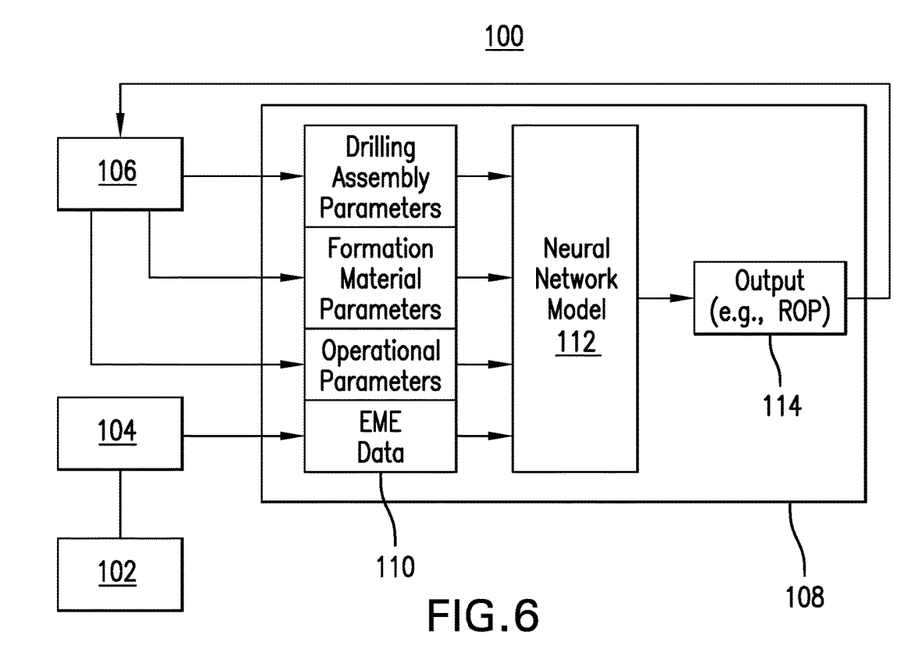
FIG. 6 is a block diagram of an embodiment of a processing system for generating drillability predictions using a neural network model.

FIG. 6 illustrates an example of a processing system 100 configured to generate drillability estimates or predictions using a neural network model. The processing system 100 may be incorporated into one or more processing units or devices, such as a downhole processing unit, a surface processing unit or combination thereof. Although the model described in this example is a neural network model, the model is not so limited.

The processing system includes a BHA, tool or other downhole device 102 (e.g., the drilling assembly 50). The device 102 may be connected to a downhole processing unit 104 for receiving and/or processing measured data such as EME measurements. A drilling control and/or monitoring unit 106 and the downhole processing unit 104 provide input data to a drillability prediction module 108, which may be a separate processing device or incorporated into the surface or downhole units.

The surface and downhole units provide input data 110 to a neural network model 112, which includes appropriate data, instructions and information to provide drillability prediction data to a user or controller. For example, the neural network outputs drillability prediction data 114 to the drilling control and/or monitoring unit 106 for use in adjusting drilling parameters to improve drillability. The neural network 112 includes an algorithm to estimate or predict drillability based on measured data and other input data describing the drilling operation, the drilling assembly and the formation.

The processing system 100 and components thereof (e.g., the downhole processing unit 104, the prediction module 108 and or the unit 106) include various components for transmitting, storing and processing data. Such components include, for example, one more of storage systems, input devices, output devices, memory, a system bus, display devices and others.

Input parameters used by the model are not limited to the specific parameters or embodiments described herein. Any other parameters or data of interest that may have an impact on drillability may also be considered. For example, large amounts of accumulated data available from the wells drilled in the past can be used in the model. Such data describes various behaviors, situations and events throughout drilling a well or a sequence of wells, and can be used as "lessons learned" and used for the prediction process.

Figure 7:
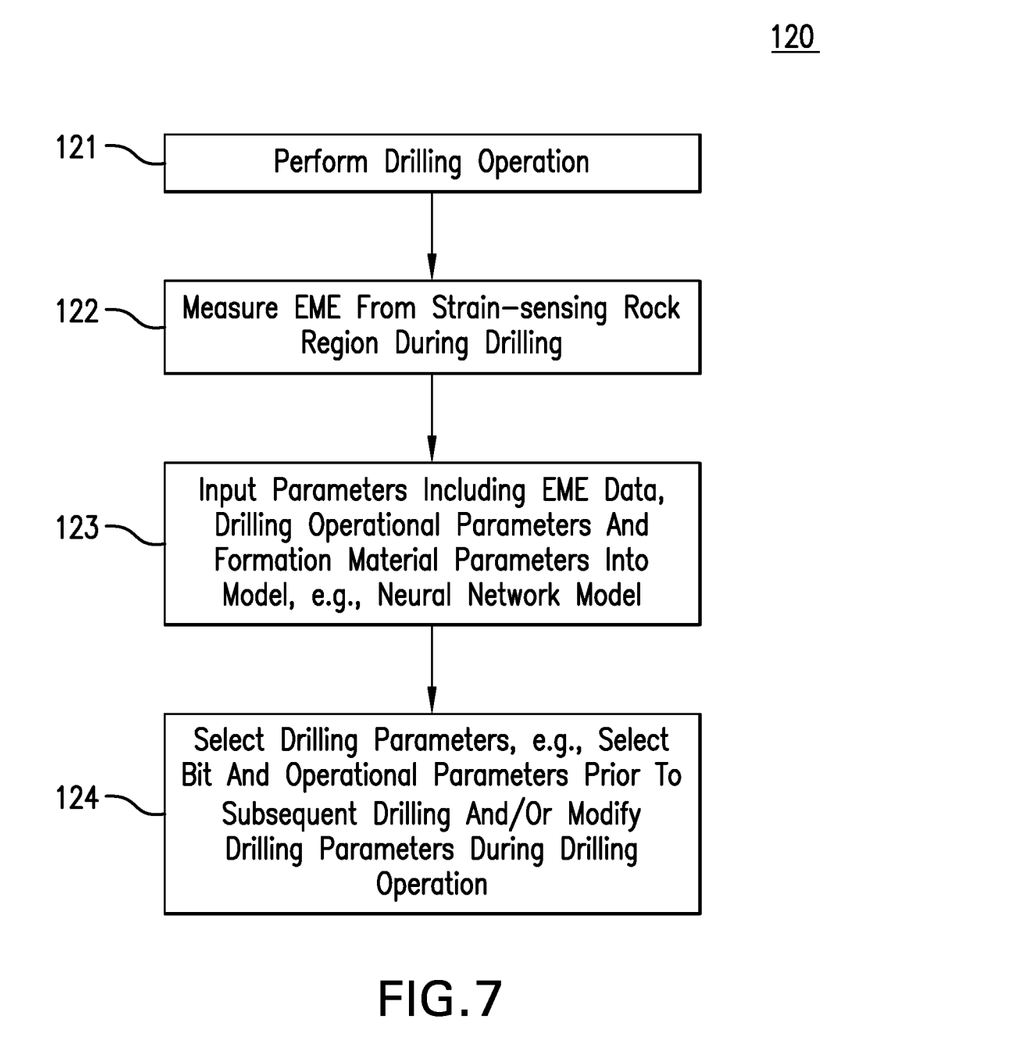
FIG. 7 is a flow chart representing an embodiment of a method of predicting and/or simulating drillability parameters for a drilling operation.

Referring to FIG. 7, a method 120 of performing drilling operations and/or predicting formation and/or rock parameters such as drillability is described. The method 120 may be executed by a computer processing system (e.g., the processing system 100, downhole electronics unit 32 and/or the surface processing unit 34) via programs or software for generating a mathematical model. At least portions of the method 120 may be performed using previously generated and stored data, or may be performed using real time data generated during a drilling operation. The method 120 includes one or more stages 121-124. In one embodiment, the method 120 includes the execution of all of stages 121-124 in the order described. However, certain stages may be omitted, stages may be added, or the order of the stages changed.

In the first stage 121, a drilling operation is performed. The operation may be performed in the borehole for which prediction is desired or in other boreholes (e.g., offset wells or historical wells). The drilling operation is performed by a suitable drilling system such as the system 10.

In the second stage 122, various measurements are performed. Such measurements include measurements of EME during the drilling operation. In one embodiment, a drilling assembly is used that has sensors for measuring different aspects of the EME. An example is the drilling assembly 50 of FIG. 2.

The EME measurements are sensitive to variations in drilling rig parameters, geological parameters, and parameters of the drilling process to allow for estimation or prediction of drillability parameters that can be used to improve or optimize a drilling operation. Different characteristics of EME can serve as indicators to be measured and processed with the purpose of the drillability prediction. In one embodiment, multiple EME sensors are included in the drilling assembly to measure different frequency ranges, such as high, medium and low radio frequencies. The EME measurements can be measured and processed for later drilling operations, or processed immediately or in real time while drilling.

In the third stage 123, a drillability prediction model is generated and/or updated using various input parameters including the EME measurements. In one embodiment, a neural network model is created and/or updated using at least the EME measurements. An exemplary neural network is shown in FIG. 5. As discussed above, the model prediction is based on principles and physical indicators related directly with the rock destruction and the amount of energy consumed thereby.

The neural network model utilizes a drillability prediction algorithm to estimate or predict drillability parameters based on various inputs including the EME measurements. An exemplary drillability prediction is a bit life prediction which provides an estimation of wear characteristics and/or the useful life of the bit. For example, the neural network model, using various inputs (including formation material parameters, operational parameters, drilling assembly parameters and EME measurements) and a selected rate of penetration (ROP), outputs a predicted or estimated bit life. The bit life can be an estimation of the time between an initial wear status (e.g., prior to drilling or at some first time during drilling) and a subsequent wear status. The useful life can be calculated based on the predicted time between the initial wear status and a maximum amount of wear for a given ROP.

In the fourth stage 124, drillability predictions are utilized in selecting and/or modifying drilling assembly and/or operational parameters to improve or optimize a drilling operation. Based on the drillability prediction, operational and/or drilling assembly parameters for a future drilling operation or a current drilling operation are selected that result in an improved or optimal drillability. For example, based on the drillability prediction, a drill bit type is selected that provides the least amount of wear for a desired ROP. In addition, operational parameters such as WOB and RPM can be selected based on the prediction.

In one embodiment, drillability prediction and operational parameter selection is performed in real time during drilling. Based on the drillability prediction, operational parameters can be modified to improve drillability, e.g., increase the life of the drill bit while staying within other constraints (e.g., total time taken to drill the well). Application of the neural network (or other suitable model) allows the operator and/or the processor to simulate or predict the effect of changing the drilling parameters from their current levels on further drilling of the wellbore. The drilling system can thus look ahead in the drilling process and determine the optimum course of action.

For example, a downhole processor such as the electronics unit 32 cooperates in real-time with a surface computer such as the surface processing unit 34. Predicted drillability parameters are estimated based on operational measurements taken by the surface processing unit 34, EME measurements taken downhole, and other data provided to the neural network model. The drillability parameters are used by the surface processing unit 34 to adjust operational parameter to provide greater drilling efficiency.

The systems and methods described herein provide various advantages over prior art techniques. Embodiments described herein provide an ability to improve or optimize performance of drilling operations, particularly in high pressure conditions. Predictions provided by such embodiments allow for the selection or modification of drilling parameters prior to drilling and during drilling. For example, the predictions allow for optimal bit selection before drilling and selection of drilling conditions sufficient for keeping drilling performance (e.g., ROP) optimal while drilling.

In addition, as discussed above, the presence of differential pressure during drilling compromises the ability of models that use parameters such as Unconfined Compressive Strength (UCS) and Friction Angle (N) to provide effective drillability predictions. For example, ROP predictions based on such models under-predict the effect of pressure on drilling. The model embodiments described herein utilize other properties, including measured EME, which provide a superior prediction relative to other models.

Generally, some of the teachings herein are reduced to an algorithm that is stored on machine-readable media. The algorithm (e.g., the drillability prediction algorithm) is implemented by the computer processing system and provides operators with desired output.

In support of the teachings herein, various analysis components may be used, including digital and/or analog systems. The digital and/or analog systems may be included, for example, in the downhole electronics unit 32 or the processing unit 34. The systems may include components such as a processor, analog to digital converter, digital to analog converter, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, motive force (such as a translational force, propulsional force, or a rotational force), digital signal processor, analog signal processor, sensor, magnet, antenna, transmitter, receiver, transceiver, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The term "or" when used with a list of at least two items is intended to mean any item or combination of items.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of predicting drilling assembly performance, comprising:
    acquiring measurements of electromagnetic (EM) radiation emitted due to destruction of formation materials by a drilling assembly during a drilling operation, the acquired measurements of EM radiation emitted due to destruction of formation materials indicative of the type of the formation materials, wherein EM radiation measurements are obtained using a first sensor configured to measure a low frequency component of the EM radiation, a second sensor configured to measure a medium frequency component of the EM radiation, and a third sensor configured to measure a high frequency component of the EM radiation;
    selecting input parameters from the acquired measurements of EM radiation;
    supplying the input parameters to a mathematical drillability model;
    generating a rock drillability parameter using the drillability model and the input parameters, the rock drillability parameter providing an indication of drilling performance;
    selecting operating conditions for at least one of the drilling operation and a subsequent drilling operation based on the drillability model; and
    performing at least one of the drilling operation and the subsequent drilling operation.

2. The method of claim 1, wherein the mathematical drillability model is a neural network model.

3. The method of claim 1, wherein the EM radiation is emitted as a result of crack formation and rock crushing in a region below a drill bit of the drilling assembly.

4. The method of claim 1, wherein the operational parameters include a selected rate of penetration (ROP), and the drillability parameter includes a prediction of drill bit wear over time as a function of the ROP.

5. The method of claim 1, wherein the input parameters are selected for a subsequent drilling operation, and the drillability parameter is generated based on the input parameters for the subsequent operation and the measurements of the EM radiation acquired during the drilling operation.

6. The method of claim 1, wherein the operational parameters are provided by at least one surface control unit configured to at least one of monitor and control the operational parameters of the drilling operation.

7. The method of claim 6, wherein the operational parameters and the measurements of the EM radiation are supplied and the rock drillability parameter is generated in real time during the drilling operation.

8. A system for predicting drilling assembly performance, the system comprising:
    a drilling assembly including a drill bit connected to a drill string, the drilling assembly configured to be disposed in a borehole and perform a drilling operation;
    a sensor device operatively associated with the drilling assembly, the sensor device configured to measure electromagnetic (EM) radiation emitted due to destruction of formation materials by the drill bit during the drilling operation and acquire measurement of the EM radiation, wherein EM radiation measurements are obtained using a first sensor of the sensor device configured to measure a low frequency component of the EM radiation, a second sensor of the sensor device configured to measure a medium frequency component of the EM radiation, and a third sensor of the sensor device configured to measure a high frequency component of the EM radiation; and
    a processor in communication with the plurality of sensors, the processor configured to:
    select input parameters from the acquired measurements of EM radiation;
    supply the input parameters to a mathematical drillability model; and
    generate a rock drillability parameter using the drillability model and the input parameters, the rock drillability parameter providing an indication of drilling performance.

9. The system of claim 8, wherein the mathematical drillability model is a neural network model.

10. The system of claim 8, wherein the processor is configured to receive the measurements of the EM radiation from a downhole processing unit, receive at least the operational parameters from a surface control unit, and provide the rock drillability parameter to the surface control unit.

11. The system of claim 10, wherein the surface control unit is configured to adjust operating conditions of the drilling operation in real time based on the rock drillability parameter.

12. The system of 8, wherein the sensor device includes a sensor configured to measure electric currents that flow in a closed circuit between the drilling assembly and a region below the drill bit during drilling.

13. The system of claim 8, wherein the operational parameters include a selected rate of penetration (ROP), and the drillability parameter includes a prediction of drill bit wear over time as a function of the ROP.

14. A non-transitory computer readable media storing instructions for execution by a processing circuit performing a method comprising:

acquiring measurements of electromagnetic (EM) radiation emitted due to destruction of formation materials by a drilling assembly during a drilling operation, the acquired measurements of EM radiation emitted due to destruction of formation materials indicative of the type of the formation materials, wherein EM radiation measurements are obtained using a first sensor configured to measure a low frequency component of the EM radiation, a second sensor configured to measure a medium frequency component of the EM radiation, and a third sensor configured to measure a high frequency component of the EM radiation;

selecting input parameters from the acquired measurements of EM radiation;

supplying the input parameters to a mathematical drillability model; and generating a rock drillability parameter using the drillability model and the input parameters, the rock drillability parameter providing an indication of drilling performance;

selecting operating conditions for at least one of the drilling operation and a subsequent drilling operation based on the drillability model; and performing at least one of the drilling operation and the subsequent drilling operation.

15. The non-transitory computer readable media storing instructions for execution by a processing circuit performing a method of claim 14, wherein the mathematical drillability model is a neural network model.

16. The non-transitory computer readable media storing instructions for execution by a processing circuit performing a method of claim 14, wherein the operational parameters are provided by at least one surface control unit configured to at least one of monitor and control the operational parameters of the drilling operation.

17. The non-transitory computer readable media storing instructions for execution by a processing circuit performing a method of claim 16, wherein the operational parameters and the measurements of the EM radiation are supplied and the rock drillability parameter is generated in real time during the drilling operation.

18. The non-transitory computer readable media storing instructions for execution by a processing circuit performing a method of claim 14, further comprising selecting operating conditions for at least one of the drilling operation and a subsequent drilling operation based on the drillability model.

* * * * *